United States Patent Office 2,711,864
Patented June 28, 1955

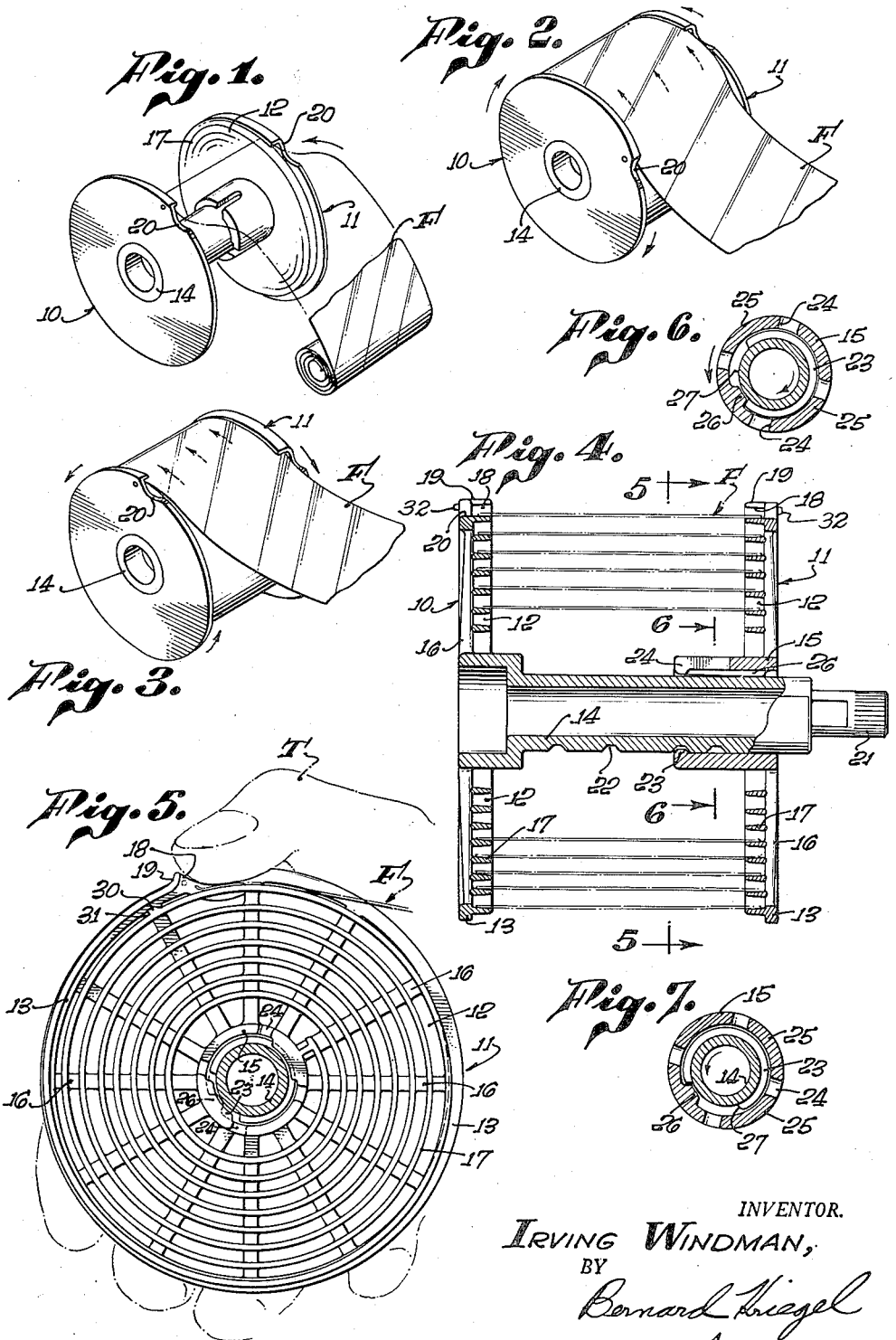

2,711,864

FILM DEVELOPING REEL

Irving Windman, Los Angeles, Calif., assignor to Windman Brothers, Los Angeles, Calif., a copartnership consisting of Philip Windman, Samuel Windman, Murray Windman, Irving Windman, Oscar Windman, and Frederick Windman Application May 1, 1953, Serial No. 352,512

4 Claims. (Cl. 242—77)

The present invention relates to reels, primarily adapted to properly hold rolls of photographic film for immersion in a developing solution contained in a film developing tank, or the like.

An object of the present invention is to provide a film developing reel into which a roll or strip of photographic film can be threaded in a more positive and easier fashion.

Another object of the invention is to provide a film developing reel capable of manipulation to feed a roll or strip of photographic film intermittently, or in step-by-step fashion, into the reel.

A further object of the invention is to provide a film developing reel capable of manipulation to feed a roll or strip of film intermittently into the reel, in which the hands of a person operating the reel are utilized to grip the film intermittently and advance it step-by-step into the reel during manipulation of the latter.

Yet another object of the invention is to provide a film developing reel having opposed side members provided with spiral grooves to receive the film, in which the side members are oscillatable with respect to each other by a person's hands which intermittently grip the film during such oscillation to advance the film into the spiral grooves.

Still a further object of the invention is to provide a film developing reel capable of manipulation to feed a film intermittently into the reel, which possesses a minimum number of parts and which is comparatively economical to manufacture.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an isometric diagrammatic view of a film developing reel, in which insertion of a roll or strip of film is being started;

Fig. 2 is a view similar to Fig. 1, disclosing the parts in another relative position to advance the film into the reel;

Fig. 3 is a view similar to Fig. 1, disclosing the parts in still another relative position to further advance the film into the reel;

Fig. 4 is a longitudinal section, on an enlarged scale, with parts shown in elevation, through a film developing reel diagrammatically disclosed in Figs. 1 to 3;

Fig. 5 is a transverse section taken along the line 5—5 on Fig. 4;

Fig. 6 is a cross-section taken along the line 6—6 on Fig. 4, and with parts of the reel occupying one relative position;

Fig. 7 is a view similar to Fig. 6, with the parts occupying another relative position.

As disclosed most clearly in Figs. 4 to 7, inclusive, a film developing reel has opposed side members 10, 11 provided with opposed, companion spiral grooves 12 in their inner portions, extending from the rims 13 of the side members and winding or coiling inwardly toward the hubs 14, 15 of the side members.

Each side member may consist of its hub portion 14 or 15, from which a plurality of radial ribs 16 extend toward the rim portion. A spirally arranged rib 17 is secured to the inner portions of the radial ribs 16 of each side member, extending inwardly in a direction parallel to the common axis of the side members. This spiral rib 17 extends from the rim portion 13 of each side member toward its hub portion 14 or 15 for the required distance, to form the spiral film receiving groove 12 above referred to. The spiral ribs 17 on the side members 10, 11 extend axially toward each other, being engageable with the marginal portions of a roll or strip of film F to be fed into the reel mechanism.

Each spiral groove or guideway 12 has an entrance 18 for the film opening outwardly through its rim portion 13. Entry of the film into this portion of each groove may be facilitated by outwardly flaring or tapering the outer end 19 of each spiral rib 17. The openings or entrances 18 on both side members 19, 11 may occupy a position substantially aligned with each other, to facilitate insertion of the end of the film F into the opposed grooves 12. The rim 13 of each side member adjacent the entrance opening 18 may be relieved to provide a recess 20 for a person's thumb T, to enable the thumb to grip the side marginal portion of a roll of film F, for the purpose of feeding the latter into the reel. If desired, however, the recesses 20 may be omitted, the entrances 18 into the grooves 12 merely opening outwardly through the peripheral portions of the rim 13.

A comparatively elongate hub 14 is integral with the ribs 16 of one side member 10, such as the left side member shown in Fig. 4, extending toward the other side member 11, and being telescoped or piloted within a comparatively short hub 15 integral with the radial ribs 16 of the other side member 11. The hubs 14, 15 are in slidable relation with respect to each other. A suitable stem 21 may project from the end of the elongate hub 14 for grasping by the hand of a person, to facilitate insertion and removal of the reel from a film developing tank (not shown).

The longitudinal distance between the opposed side members 10, 11 may be adjusted, to accommodate different widths of film F, and retained in such adjusted position. To accomplish this purpose, longitudinally spaced arcuate or circumferential grooves 22 are formed in the periphery of one of the hub members, such as the elongate hub member 14, to receive detents or ribs 23 projecting inwardly from the other hub member 15. As disclosed in the drawings, the detents or ribs 23 extend inwardly from and are integral with the inner end of the short hub 15, this hub being provided with circumferentially spaced longitudinally extending slots 24 to provide spring-like fingers or portions 25 that enable the detents 23 to spring into and out of the circumferential grooves 22 when endwise pressure is exerted upon the hubs. To facilitate the lateral movement of the detent portions 23, the sides of the circumferential grooves and of the detent portions may be tapered, to cause the detent members to be cammed out of each groove, allowing the side members 10, 11 to be shifted toward or away from one another. Once received in a selected circumferential groove 22, the detents 23 will remain in such groove, holding the side members in proper spaced relation with respect to each other.

The short hub 15 has an internal key 26 received within a longitudinally extending slot or keyway 27 in the periphery of the elongate hub 14, the keyway being substantially wider than the width of the key 26. When the key is disposed within the slot 27, the thumb recesses 20 of the side members and the entrance openings 18 into the opposed spiral grooves 12 may be placed in a position substantially in alignment with each other. As an example, when the key 26 is disposed approximately midway of the width of the keyway or slot 27 within the elongate hub 14, the thumb recesses 20 and entrance openings 18 are in alignment with each other.

The fact that the key slot 27 is of a much greater arcuate extent than the key 26 provides for lost motion between the left and right side members 10, 11 of the reel, which is availed of for the purpose of feeding the film F into the reel in a manner to be described. However, only a limited relative arcuate movement between the side members can occur, as determined by engagement of the key 26 with one side of the slot or the other.

When a roll or strip of film F is to be threaded into the reel, the hubs 14, 15 are telescoped with respect to each other, so that the detent 23 is received within the appropriate circumferential groove 22 to accommodate the width of the film. An end of the film is then inserted into both entrance openings 18 in the opposed spiral grooves 12 (Fig. 1), and the side members 10, 11 then held by the fingers of the hands, with the thumbs T of the hands placed in the thumb recesses 20 and overlying the side marginal portions of the film. That is to say, the left side member 10 will rest in the fingers of the left hand, with the left thumb disposed in the thumb recess 20, whereas the right side member 11 will be held in the fingers of the right hand with the right thumb disposed in the right thumb recess 20. After the film has been started in the grooves 12 by inserting it through the entrance openings, the side members 10, 11 are oscillated with respect to each other, to advance the film into the grooves. When the left side member 10, for example, is moved in a forward or film advancing direction (Fig. 3), the left thumb will grip the left marginal edge of the film F, to carry the film forwardly further into the groove of the right side member, the right thumb being released or disengaged from the film. The left member 10 is movable to its maximum extent, as determined by engagement of the key 26 with one side of the slot, as shown in Fig. 6. Thereafter, the right thumb is caused to press against the right margin of the film and the left thumb released, the right side member 11 then being moved arcuately in a film advancing direction, as shown in Fig. 2, which will feed the film further into the spiral groove in the left side member. The right side member 11 can be moved to the extent determined by engagement of the key 26 with the other side of the slot 27 (Fig. 7). If desired, the left member 10 can be reversely rotated while the right member is advancing, but during such reverse movement, the left thumb is released from the film. Thereafter, the left thumb can again grip the film and the right thumb released, the left side member 10 again being manipulated in a film advancing direction to further feed the film into the reel, the right member 11 being reversely rotated. The above procedure may continue, alternating the engagement of the left and right thumbs with the film and at the same time advancing the side of the reel at which thumb pressure is being applied, while reversely turning the other side member, to feed the film into the reel until complete threading of the film has been accomplished.

As stated above, while one side member is being moved in a film advancing direction, the other side member is being moved in a reverse direction, the side members being oscillated or reciprocated with respect to each other to advance the film. While return movement of a side member free of thumb pressure at that side is being undertaken, the other thumb is pressing the film, so that there is no possibility of the film being fed inadvertently in a rearward direction, or of otherwise partaking of reverse or retrograde movement. The film will feed inwardly through the spiral grooves 12 toward the hub portions 14, 15 until it has been completely threaded into the reel. Should there be any tendency for the film to partake of retrograde movement after once having been fed into the reel, such movement is precluded by engagement of the rear end of the film F with a suitable stop 30 on each side member 10, 11 projecting upwardly from the rib 17 adjacent and inwardly of the entrance opening 18. Each stop 30 is tapered toward the rim 13 of each side member in a film feeding direction, and has an abrupt shoulder 31 engaged by the rear end of the film, to prevent movement of the latter in a reverse direction after the film has been threaded fully into the reel.

The thumb recesses 20 advise the person manipulating the apparatus of the location of the entrance openings 18. If desired, other indicating means may be employed to disclose the location of the entrance opening, such as the provision of protuberances 32 extending in an outward direction from the rim portion 13 of each side member adjacent its entrance opening 18.

Once the film F has been completely threaded into the reel, the stem 21 may be grasped by the hand and the loaded reel inserted in a developing tank (not shown). The developing solution can contact all parts of the film by passing between the radial ribs 16 and the turns of the spiral ribs 17 defining the spiral grooves 12. The spiral ribs 17 will maintain the turns of the spirally wound film F separate from each other to be acted upon fully and completely by the developing solution. After the film has been immersed in the developing solution for the requisite time, the stem 21 may be grasped by the hand and the loaded reel removed from the developing tank.

It is, accordingly, apparent that a film developing reel has been provided, in which the feeding of the strip or roll of film F into the reel is facilitated. The reel members 10, 11 need merely be oscillated and thumb pressure applied alternately to one side and then the other side of the film to secure appropriate threading of the film into the spiral grooves 12. In a sense, the person's hands not only serve to oscillate the side members 10, 11 of the reel with respect to each other, to secure intermittent or step-by-step feeding of the film into the reel, but they each function as an intermittent gripping or clutching element which is coupled to the film to advance it in a forward direction, and then released from the film when the particular side member held by the hand is shifted in a reverse direction.

The inventor claims:

1. In a photographic film holding device: a pair of opposed members between which photographic film is to be inserted and having opposed ribs defining opposed guideways in which the marginal portions of the film are receivable, said guideways having entrances opening outwardly through outer portions of said members; means mounting said members for reciprocation with respect to each other; the outer portions of said members adjacent said entrances being provided with recesses to receive the thumbs of a person's hands which are holding said members to enable such thumbs to intermittently press the marginal portions of the film against the outwardly facing walls of said ribs adjacent said entrances, whereby the thumbs intermittently effect feeding of the film along said opposed guideways during relative reciprocation between said members.

2. In a photographic film holding reel: a pair of opposed members between which photographic film is to be inserted and having opposed spiral ribs defining opposed spiral guideways in which the marginal portions of the film are receivable, each of said members having an entrance into its guideway opening through its rim portion; means mounting said members for substantial arcuate movement with respect to each other; the rim portions of said members at said entrances being provided with recesses of a size capable of receiving the thumbs of a person's hands which are holding said members to enable such thumbs to intermittently press the film against the outwardly facing walls of said ribs adjacent said entrances, whereby the thumbs intermittently effect feeding of the film along said opposed spiral guideways during relative reciprocation between said members.

3. In a photographic film holding device as defined in claim 1, wherein each of said guideways is free from obstruction from a region adjacent the entrance to said guideway, said guideway being of uniform height throughout its extent.

4. In a photographic film holding device as defined in claim 2, wherein each of said spiral guideways is free of obstruction from a region adjacent the entrance thereinto, each guideway being of uniform height throughout its extent.

References Cited in the file of this patent

UNITED STATES PATENTS

| | | |
|---|---|---|
| 2,578,262 | Paterson | Dec. 11, 1951 |
| 2,595,898 | Siedenburg | May 6, 1952 |
| 2,619,300 | Bartholy | Nov. 25, 1952 |